US009426389B1

(12) United States Patent
Hornback et al.

(10) Patent No.: US 9,426,389 B1
(45) Date of Patent: Aug. 23, 2016

(54) SECOND IMAGING DEVICE ADAPTABLE FOR USE WITH FIRST IMAGING DEVICE AND METHOD FOR USING SAME

(71) Applicant: Vectronix, Inc., Ashburn, VA (US)

(72) Inventors: William B. Hornback, Homeland, CA (US); Douglas Harwood, Newfields, NH (US); Brian Tussey, Bloomington, IN (US)

(73) Assignee: Vectronix Inc., Ashburn, VA (US)

( * ) Notice: Subject to any disclaimer, the term of this patent is extended or adjusted under 35 U.S.C. 154(b) by 0 days.

(21) Appl. No.: 14/179,089

(22) Filed: Feb. 12, 2014

Related U.S. Application Data

(63) Continuation of application No. 13/684,538, filed on Nov. 25, 2012, now abandoned, which is a continuation of application No. 13/438,013, filed on Apr. 3, 2012, now abandoned, which is a continuation of application No. 12/456,345, filed on Jun. 15, 2009, now abandoned.

(60) Provisional application No. 61/137,302, filed on Jul. 28, 2008, provisional application No. 61/132,003, filed on Jun. 14, 2008.

(51) Int. Cl.
*G02F 1/01* (2006.01)
*H04N 5/33* (2006.01)
*H01J 31/50* (2006.01)
*G01J 5/00* (2006.01)

(52) U.S. Cl.
CPC ......... *H04N 5/332* (2013.01); *G01J 2005/0077* (2013.01); *H01J 31/50* (2013.01)

(58) Field of Classification Search
None
See application file for complete search history.

(56) References Cited

U.S. PATENT DOCUMENTS

| 4,000,419 | A | 12/1976 | Crost et al. | |
| 4,407,009 | A * | 9/1983 | Adamson et al. | 348/164 |
| 4,655,562 | A | 4/1987 | Kreitzer et al. | |
| 4,869,575 | A | 9/1989 | Kubik | |
| 5,214,285 | A | 5/1993 | Metivier | |
| 5,270,545 | A | 12/1993 | Phillips | |
| 5,534,696 | A | 7/1996 | Johansson et al. | |
| 6,023,372 | A | 2/2000 | Spitzer et al. | |
| 6,560,029 | B1 * | 5/2003 | Dobbie et al. | 359/631 |
| D518,498 | S | 4/2006 | Reed et al. | |
| 7,110,184 | B1 | 9/2006 | Yona et al. | |
| 7,170,057 | B2 | 1/2007 | Filipovich et al. | |
| 7,307,793 | B2 | 12/2007 | Ottney et al. | |
| 7,541,581 | B2 * | 6/2009 | Reed et al. | 250/330 |
| 2002/0030163 | A1 | 3/2002 | Zhang | |
| 2007/0013997 | A1 | 1/2007 | Zadravec et al. | |
| 2008/0302966 | A1 * | 12/2008 | Reed et al. | 250/330 |
| 2010/0243890 | A1 * | 9/2010 | Hall | 250/330 |

OTHER PUBLICATIONS

Office Action dated Feb. 18, 2011, in connection with U.S. Appl. No. 12/456,345, filed Jun. 15, 2009; Hornback.

(Continued)

*Primary Examiner* — David Porta
*Assistant Examiner* — Hugh H Maupin
(74) *Attorney, Agent, or Firm* — Downs Rachlin Martin PLLC

(57) ABSTRACT

A second imaging device such as a thermal imager adapted for use with a first imaging device such as an image intensifier night vision goggle system whereby the output image of the second imaging device is collimated and projected upon the objective lens of the first imaging device to provide an optically fused image to the viewer.

21 Claims, 4 Drawing Sheets

(56) References Cited

OTHER PUBLICATIONS

Response to Office Action dated Aug. 13, 2011, in connection with U.S. Appl. No. 12/456,345, filed Jun. 15, 2009; Hornback.

Final Office Action dated Oct. 13, 2011, in connection with U.S. Appl. No. 12/456,345, filed Jun. 15, 2009; Hornback.

Office Action dated May 29, 2012, in connection with U.S. Appl. No. 13/438,013, filed Apr. 3, 2012; Hornback.

Office Action dated Aug. 14, 2013, in connection with U.S. Appl. No. 13/684,538, filed Nov. 25, 2012; Hornback.

* cited by examiner

SECOND IMAGING DEVICE ADAPTABLE FOR USE WITH FIRST IMAGING DEVICE AND METHOD FOR USING SAME

RELATED APPLICATION DATA

This application is a continuation of U.S. patent application Ser. No. 13/684,538, filed on Nov. 25, 2012, from which priority is claimed and which is incorporated by reference herein, and which in turn is a continuation of U.S. patent application Ser. No. 13/438,013, filed on Apr. 3, 2012, now abandoned and from which priority is claimed and which is incorporated by reference herein, and which in turn is a continuation of U.S. patent application Ser. No. 12/456,345, filed on Jun. 15, 2009, now abandoned and from which priority is claimed and which is incorporated by reference herein, and which relates to U.S. Provisional Patent Application Ser. No. 61/137,302 entitled "Detachable Thermal Imager Adaptable for Use with Night Vision Goggle", filed Jul. 28, 2008, and U.S. Provisional Patent Application Ser. No. 61/132,003 entitled "Thermal Imager Adaptable for Use with Night Vision Goggle", filed Jun. 14, 2008, each of which is incorporated herein by reference and to which priority is claimed pursuant to 35 U.S.C. 119.

FIELD OF THE INVENTION

The invention relates generally to the field of imaging systems and assemblies such as night vision systems, e.g., image intensification and thermal/infrared imaging systems.

BACKGROUND

A night vision, image-intensifying goggle system, such as the AN/PVS-7 Night Vision Goggles (NVG) shown in FIG. 1, utilizes low light-level, image-intensification technology that does not see well in smoke, dust or other obscurants nor does it see well in unlit rooms, underground caverns and other environments where there is insufficient ambient visible light to generate a usable intensified image. As a result, a user, e.g., a combat soldier, of such an image-intensifier (I2) system may be vulnerable in the above environments and may be unable to carry out his or her mission without being subject to undue risk.

Such NVG systems are currently fielded in large numbers to military personnel but lack the ability to generate infrared imagery, also referred to as thermal imagery herein, (e.g., long wave infrared or LWIR) in, for instance, the about 8 to about 14 micron region of electromagnetic radiation spectrum.

By providing a second imaging device, such as a thermal imaging system as an add-on or clip-on to a first imaging device, (e.g., existing fielded image-intensifying night vision gear), a war fighter is benefited by being able to perform missions in dark environments and by having increased situational awareness using both image intensification and thermal imaging technology.

Further, the disclosed invention significantly increases the detection range of common NVG targets (humans, vehicles, etc.) having minimal temperature differences, which detection is only available using imagery in the infrared spectrum.

By providing a thermal imager that is selectively mountable/demountable to existing I2 NVGs, the currently fielded NVGs have a continued future use with improved capability rather than becoming obsolete hardware. In addition, the currently fielded NVG products are easily upgraded using the disclosed invention for a fraction of the development cost of a new fused imaging system that would incorporate integrated image intensified and thermal capability in a single device.

SUMMARY OF THE INVENTION

The invention relates to a second imaging device, such as a thermal imaging device, adapted for use with a first imaging device such as an image intensifying ("I2" herein) night vision system. An example of a first imaging device is a night vision goggle system ("NVG" herein) that utilizes an image-intensifier tube. As is known, such I2 systems are used in a variety of applications to collect and amplify ambient visible light and comprise suitable optics and electronics for outputting an image-intensified scene to a display such as to one or more eye pieces in an NVG.

The invention disclosed herein may desirably be used to take advantage of currently fielded I2 systems whereby, for instance, the image of a thermal/infrared scene viewed by the thermal imaging device of the invention is overlaid, i.e., optically fused, with the same image-intensified scene generated by an existing I2 device. The resultant image provides a fused image to the viewer giving the viewer both I2 and/or thermal imaging capability.

In a first aspect of the invention, a device for operating an existing first imaging device in an optically fused mode of operation is provided wherein the invention comprises a first objective lens and has a responsivity to a first range of the electromagnetic radiation spectrum. The first aspect comprises a second imaging device having a responsivity to a second range of the electromagnetic radiation spectrum and comprises an electronic display having an output and projection means for projecting the display output so as to be optically received by the first objective lens.

In a second aspect of the invention, an imaging device is provided comprising a first imaging device having a first objective lens, a second imaging device comprising an electronic display having an output and projection means for projecting the electronic display output upon the first objective lens.

In a third aspect of the invention, the second imaging device further comprises means for optically collimating said electronic display output.

In a fourth aspect of the invention, the first imaging device comprises an image intensifier tube.

In a fifth aspect of the invention, the second imaging device generates an image that is responsive to a wavelength of about the 8 to about the 14 micron in the electromagnetic spectrum.

In a sixth aspect of the invention, the second imaging device generates an image that is responsive to a wavelength of about 1 to about the 30 microns in the electromagnetic spectrum.

In a seventh aspect of the invention, the invention further comprises mounting means for rigidly affixing the second imaging device to the first imaging device whereby the electronic display output is projected upon the first objective lens at a user-defined position.

In an eighth aspect of the invention, the mounting means further comprises means for adjusting the X-Y position of the electronic display output with respect to the first objective lens.

In a ninth aspect of the invention, the display output adjusting means is comprised of electronic circuitry.

In a tenth aspect of the invention, the display output adjusting means is comprised of mechanical adjustments means.

In an eleventh aspect of the invention, a method for viewing a scene is provided comprising viewing a scene with a first imaging device having a responsivity to a first range of the electromagnetic radiation spectrum and comprising a first objective lens, viewing substantially the same scene with a second imaging device having a responsivity to a second range of the electromagnetic radiation spectrum comprising an electronic display having an output and projecting the electronic display output upon the first objective lens.

These and other aspects of the invention are further described and claimed below.

In a preferred embodiment of the invention, the second imaging device is a thermal imaging device and the first imaging device is an I2 NVG.

By way of example and not by limitation, the preferred embodiments discussed below shall include a thermal imaging device and an I2 NVG but it is expressly understood that the invention is not limited solely to the use of such devices.

For instance, the second imaging device may be an imaging device responsive to the near infrared (NIR) region of the electromagnetic spectrum (about 0.7-1.0 microns) and the first imaging device may be responsive to the visible light spectrum (about 400-700 nm). Further, the invention is not limited to use with NVG assemblies but can include use with any first imaging device having an objective lens.

As will be shown in the accompanying figures, the thermal imaging device is preferably rigidly affixed proximal the NVG objective lens whereby the received thermal images are projected onto or injected into the NVG objective lens by means of a collimated and projected OLED image.

A thermal imaging device that, in one embodiment may be mountable/removable is provided comprising a thermal imager housing adapted to be received by an existing I2 night vision device. In a further embodiment, a mounting or clip-on bracket or clamping means is provided that is preferably configured with means for affixing the mounting bracket to an existing I2 imaging device such as an image intensifier night vision goggle device.

The thermal imaging device may comprise a thermal imager housing, thermal imaging optics and electronics and further comprises an electronic display for outputting a visual representation of a scene.

The electronic display output is optically collimated and projected onto the surface of or into the I2 objective lens whereby the output is received by same by appropriate projection optics, which is preferably disposed proximal the surface of the objective lens at a predetermined or user-defined location.

This approach provides for a very simple conversion from I2 capability to a fused thermal and I2 capability or, if required, a user may selectively disable the I2 function of the device and view only the thermal image being projected into the I2 objective lens.

An alternative preferred embodiment entails the removal of the existing I2 objective lens and the replacement of same with an integrated, smaller I2 objective lens that is combined with a miniature thermal imaging camera.

Certain aspects of the invention utilize the eyepieces and mechanical housings/assemblies of existing NVGs. The disclosed invention in its various embodiments provides an approach for incorporating lightweight, low power, small size thermal imaging camera technology onto existing NVGs in the field without having to modify the NVG. A second but equally important benefit of the invention is the ability to provide a thermal imaging device that is inexpensive and affordable in volume.

BRIEF DESCRIPTION OF THE DRAWINGS

The just summarized invention may be best understood with reference to the following drawings of which.

DETAILED DESCRIPTION

The invention relates generally to the field of imaging systems and assemblies such as night vision systems, e.g., image intensification and thermal/infrared imaging systems.

Being generally described in the foregoing, it will be apparent that the invention disclosed in the instant application provides significant functional benefits summarized in the introductory portion of the specification.

Figure 1:
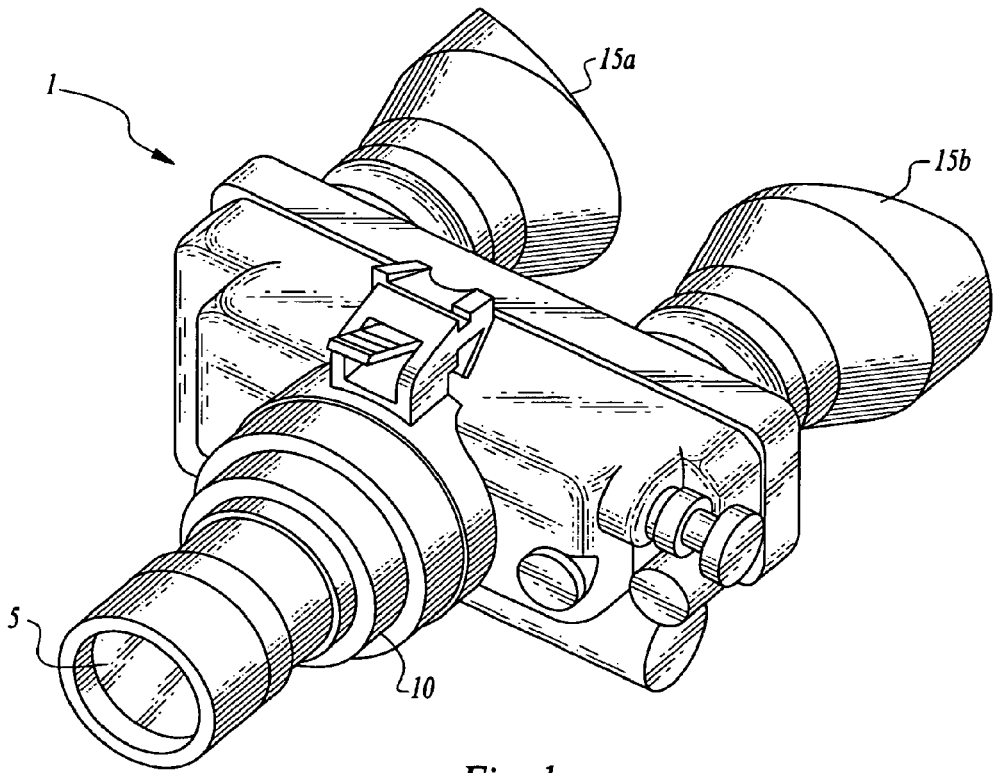
FIG. 1 is a perspective view of a dual eyepiece image intensifier viewing device.

Equivalent elements in the drawings are designated with like numerals among the several views. As seen in FIG. 1, a perspective view of a first imaging device 1 is provided, illustrated here as a dual eyepiece image intensifier viewing device, e.g., an AN/PVS-7 Night Vision Goggle assembly. As stated below, first imaging device 1 may, but is not required to be an electronic imaging device.

Turning now to FIG. 1, first imaging device 1 comprises a first objective lens 5, a first objective lens housing 10 and one or more eyepieces 15a and 15b.

Figure 2:
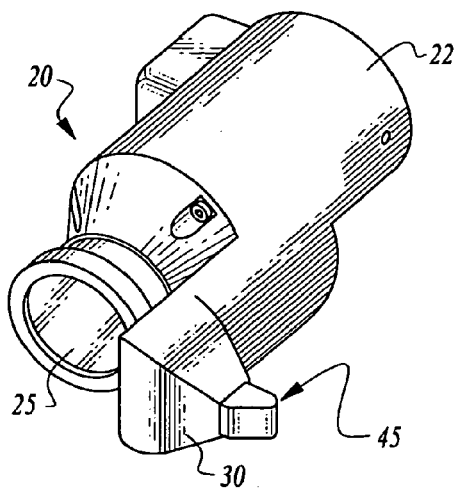
FIG. 2 is a perspective view of a preferred embodiment of a thermal imaging device of the invention.

Similarly, FIG. 2 shows a perspective view of a preferred embodiment of the second imaging device 20, here shown as a thermal imaging assembly. Second imaging device 20 comprises a second imaging device housing 22, a second objective lens 25 and projection means 30 suitable for projecting an image from the output of second imaging device 20 onto or into first objective lens 5 as discussed below. Second imaging device 20 comprises imaging electronics such as an FPA, related FPA processing electronics, an electronic display means such as for example, an organic light emitting diode array ("OLED" herein).

Figure 3:
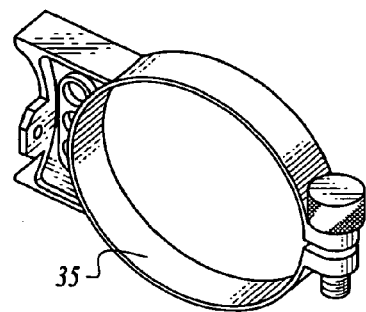
FIG. 3 is a perspective view of a preferred embodiment of a mounting clip of the invention.

Yet further, FIG. 3 is a perspective view of a preferred embodiment of the mounting means 35 of the invention. Mounting means 35 is adapted to permit its selected attachment to first imaging device 1, (e.g., mounting to first objective lens housing 10) and for the receiving, such as by clamping, clip-on assembly, threaded, friction fit, detent or equivalent means for attachment of second imaging device 20 whereby second imaging device 20 may be selectively rigidly mounted on or removed from first imaging device 1 by a user.

Just as above, in the preferred embodiment of FIG. 3, mounting means 35 is rigidly affixed to first imaging device 1, such as by a screw or other threaded device.

In the illustration of FIG. 3, the preferred embodiment of mounting means 35 comprises a circular clamp with threaded means for the variable compressing or decompressing of the clamping structure about the circumference of second imaging device 20 whereby tightening the clamp structure rigidly affixes and retains second imaging device 20 within the clamp.

The mounting orientation of second imaging device 20 is such that projection means 30 is disposed proximal and offset of center of first objective lens 5 whereby the output of projection means 30 is imaged upon but does not completely obscure the center of first objective lens 5 as better illustrated in the later views.

Figure 4:
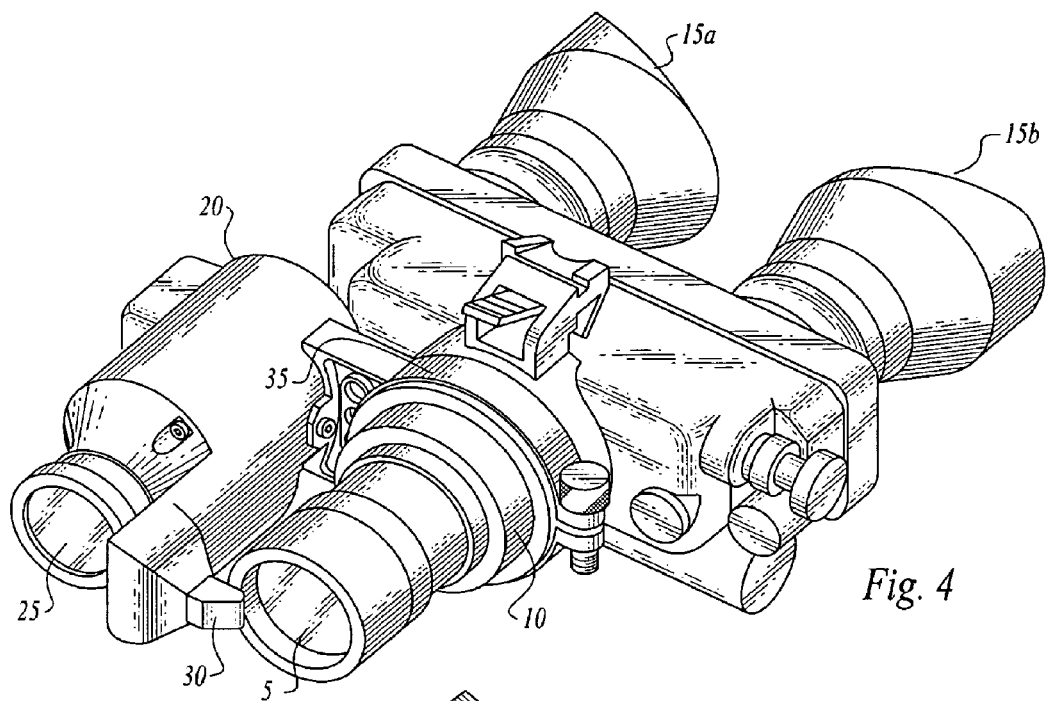
FIG. 4 is a perspective view of a preferred embodiment of a thermal imaging device of the invention mounted on the image intensifier viewing device of FIG. 1.
Figure 5:
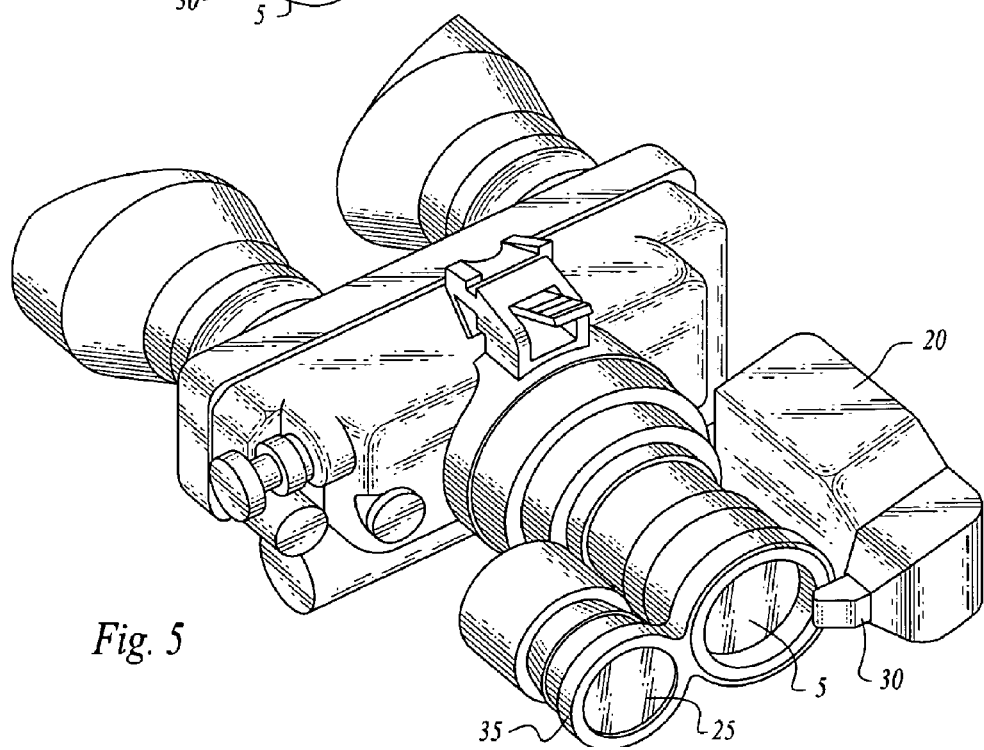
FIG. 5 is an alternate perspective view of a preferred embodiment of a thermal imaging device of the invention mounted on the image intensifier viewing device of FIG. 1.
Figure 6:
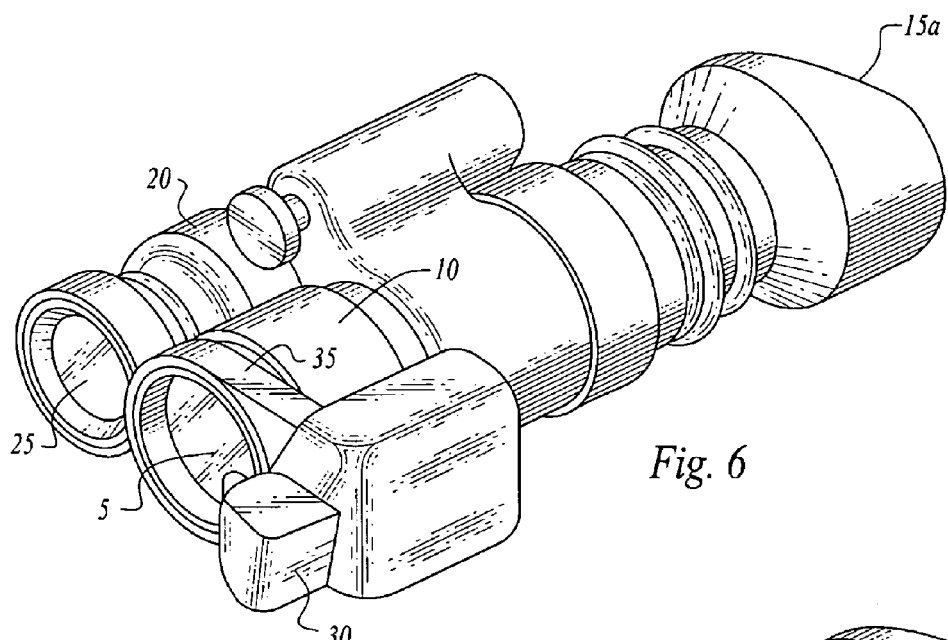
FIG. 6 is a perspective view of a preferred embodiment of the thermal imaging device of the invention mounted on a single eyepiece image intensifier viewing device.
Figure 7:
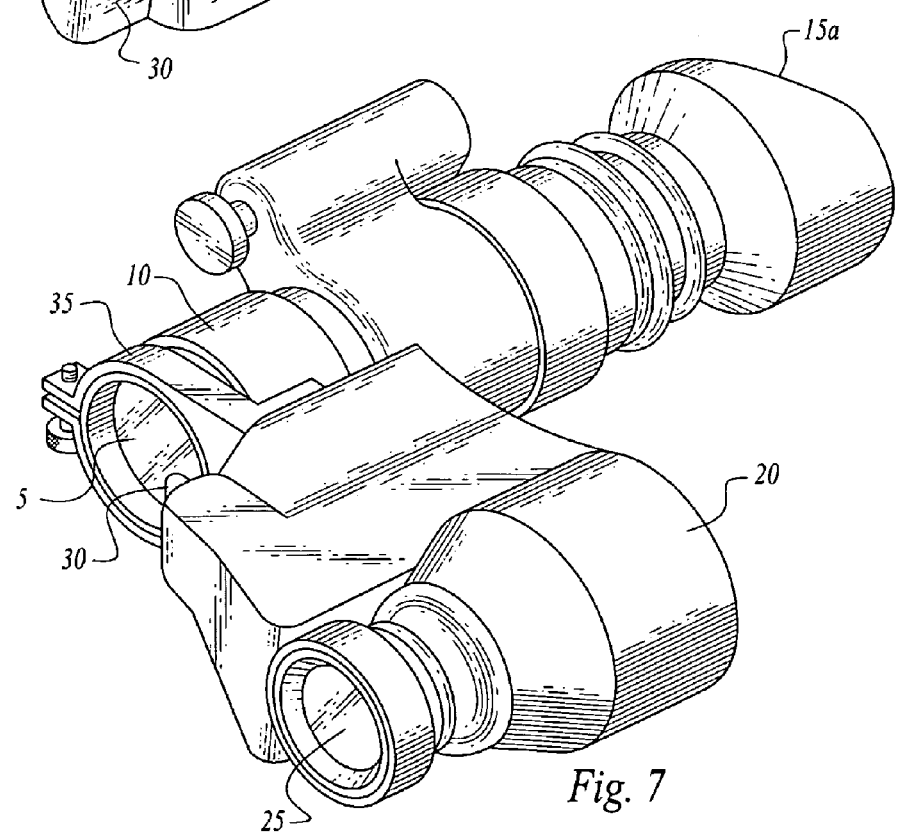
FIG. 7 is an alternate perspective view of a preferred embodiment of a thermal imaging device of the invention mounted on a single eyepiece image intensifier viewing device.

Embodiments as shown in FIGS. 4 and 5 disclose alternative views of first imaging device 1 with second imaging device 20 mounted thereon using mounting means 35. In these preferred embodiments, the electronic output of second imaging device 20 may conveniently be routed to projection means 30 using electronic wiring, a ribbon cable, harness or the like (not shown).

As alternative embodiments of FIGS. 4 and 5, FIGS. 6 and 7 illustrate second imaging device 20 mounted on first imaging device 1 wherein first imaging device 1 is comprised of a single eyepiece 15a and wherein mounting means 35 is affixed to first objective lens housing 10.

Figure 8:
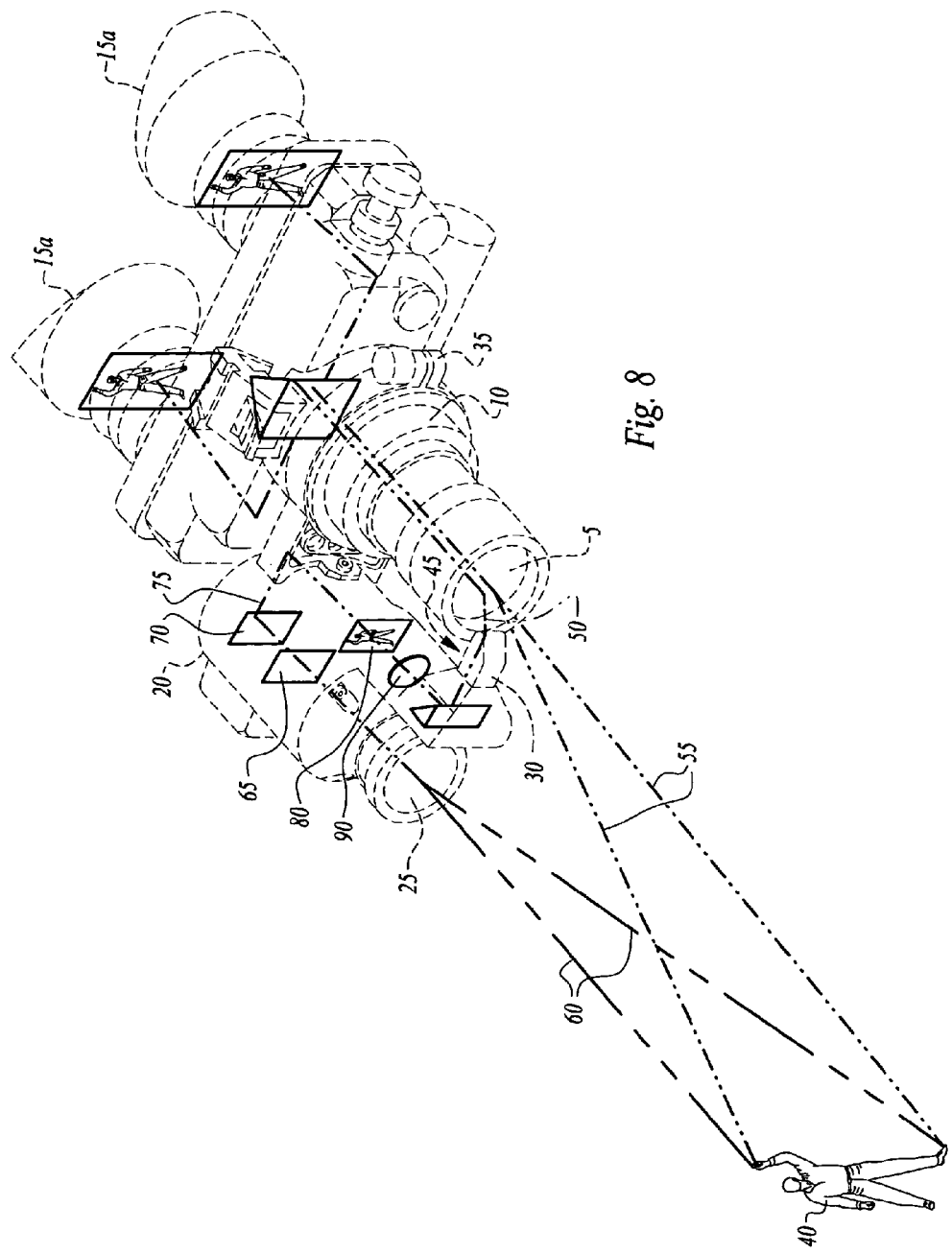
FIG. 8 is a block diagram of the invention illustrating the optical fusing of a scene using the thermal and image intensified image.

The image path of an optically fused scene in the invention is illustrated in FIG. 8.

First objective lens 5 and second objective lens 25 view scene 40. Because each objective lens is proximal the respective other lens, each shares substantially the same field of view and therefore the scene is viewed substantially identically by each of first and second objective lenses.

First imaging device 1 preferably has a responsivity (i.e., generates an image in response to) to a first range of the electromagnetic radiation spectrum and comprises first objective lens 5.

Second imaging device 20 preferably has a responsivity (i.e., generates an image in response to) to a second range of the electromagnetic radiation spectrum and comprises second objective lens 25 and an electronic display 45 such as an OLED having a display output 50. In a preferred embodiment, the invention uses an OLED display, 800×600 VGA, Part No. EMA-100100-01, as is available from eMagin Corp. FIG. 2 further comprises collimating means and suitable optics for projecting the output of the OLED to the first objective lens so as to be received by same as is illustrated in the later views. Second imaging device 20 comprises projection means 30 for projecting display output 50 upon the surface of or into first objective lens 5 such that the optical image is received by or through first objective lens 5.

Second imaging device 20 is affixed to first imaging device 1 by mounting means 35 whereby projection means 30 is disposed proximal to first objective lens 5 and whereby output 50 is projected into first objective lens 5.

First objective lens 5, here illustrated as the objective lens of an I2 night vision goggle assembly, views scene 40 and receives reflected ambient light 55 therefrom through first objective lens 5. Ambient light 55 is electronically amplified by, for instance, an image intensifier tube, to allow a user to see a light-intensified image of scene 40 in one or more eye pieces 15a and 15b.

Concurrently, infrared electromagnetic radiation 60 ("IR") emanating from scene 40 in the same field of view is received by second objective lens 25 of second imaging device 20 such as electromagnetic radiation in the about 8 to about 14 micron wavelength. Infrared electromagnetic radiation 60 is received from second objective lens 25 and focused upon a microbolometer focal plane array ("FPA") 65. Second imaging device 20 comprises suitable FPA processing electronics 70. In an alternative preferred embodiment, FPA 65 is a U3500 320×240, 25 um focal plane array as is available from DRS Technologies, Inc.

FPA electronic output 75 is provided to the electronic display 80, in this embodiment an OLED, which generates a visible representation of the thermal image of scene 40.

The output of OLED 80 is preferably optically collimated prior to projection using appropriate collimating optics 90. The collimated OLED output of second imaging device 20 is subsequently projected upon or into first objective lens 5 using suitable projection means 30, for instance suitable optical lenses, prisms and reflective elements.

The projected image from second imaging device 20 should be in approximate X-Y alignment with the scene viewed by first imaging device 5 in order to overlay and align the image from second imaging device 20 with that generated by first imaging device 1. This may be accomplished electronically using built-in OLED display vertical and horizontal adjustments as are provided with the above OLED. Alternatively, X-Y adjustment may be accomplished by mechanical means such as a set of X-Y threaded adjusting screws provided on mounting means 35 or on the housing of second imaging device 20 or any equivalent means for orienting the projected scene image with respect to that viewed by first objective lens 5.

The following claims are intended not only to cover the specific embodiments disclosed, but also to cover the inventive concepts explained herein with the maximum breadth and comprehensiveness permitted by the prior art.

The words used in this specification to describe the invention and its various embodiments are to be understood not only in the sense of their commonly defined meanings, but to include by special definition in this specification, structure, material or acts beyond the scope of the commonly defined meanings. Thus, if an element can be understood in the context of this specification as including more than one meaning, then its use must be understood as being generic to all possible meanings supported by the specification and by the word itself.

The definitions of the words or elements are defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements or that a single element may be substituted for two or more elements.

Insubstantial changes from the subject matter as viewed by a person with ordinary skill in the art, now known or later devised, are expressly contemplated as being equivalent. Therefore, obvious substitutions now or later known to one with ordinary skill in the art are defined to be within the scope of the defined elements.

The inventions are thus to be understood to include what is specifically illustrated and described above, what is conceptually equivalent, what can be obviously substituted and also what essentially incorporates the fundamental idea of the invention.

For instance, it is expressly contemplated that the above first and second imaging devices are not each required to be electronic and that inactive imaging devices such as binoculars or telescopes are within the scope of the claims for both imaging devices. Furthermore, it is expressly contemplated that the second imaging device not require an objective lens and that, for instance, the output of a LADAR or other sensor or imaging device may be projected onto or into first objective lens 5.

Although elements may be described above as acting in certain combinations, it is to be expressly understood that one or more elements from a combination can, in some cases be excised from the combination and that the combination may be directed to a sub-combination or variation of a sub combination.

What is claimed is:

1. A device for optically fusing thermal and intensified images of a scene, comprising:
    a first imaging device configured to view ambient light reflected from the scene, the first imaging device having a first objective lens with a first field of view and a center, an image intensifier tube arranged to receive and intensify ambient light from the first objective lens imaged thereon, and at least one eyepiece for viewing the intensified ambient light as the intensified image of the scene; and
    a second imaging device removably and adjustably mounted to the first imaging device, the second imaging device configured to view infrared light emitted from the scene, the second imaging device having a second objective lens with a second field of view that is substantially the same as the first field of view, a focal plane array arranged to receive an infrared image of the scene from the second objective lens, an electronic display operably connected to the focal plane array and configured to output a visible representation of the thermal image, and projection optics for receiving the visible representation of the thermal image and projecting it into the first objective lens offset of the center thereof and proximal thereto so that the visible representation of the thermal image is in at least approximate alignment with the intensified image of the scene when viewed through the at least one eyepiece of the first imaging device.

2. The device according to claim 1, wherein the electronic display comprises an organic light-emitting diode (OLED) display operably arranged relative to collimating optics so that the visible representation of the thermal image displayed on the OLED is collimated when entering the first objective lens.

3. The device according to claim 1, wherein the infrared light has a wavelength in the range from about 1 microns to about 30 microns.

4. The device according to claim 1, further including a clamp configured to allow the second imaging device to be said removably and adjustably mounted to the first imaging device in a clip-on fashion.

5. The device according to claim 1, further comprising adjusting means for adjusting a position of the electronic display output with respect to the first objective lens.

6. The device according to claim 5, wherein said adjusting means is comprised of electronic circuitry.

7. The device according to claim 5, wherein said adjusting means is mechanical.

8. A method of presenting a scene to a viewer, comprising:
    collecting reflected visible ambient light from the scene with a first objective lens having a center, and forming a first image from the collected visible ambient light;
    intensifying the first image to form an intensified first image and then presenting the intensified first image through at least one eyepiece;
    collecting infrared light emitted from the scene with a second objective lens and forming a thermal image;
    converting the thermal image to a visible representation of the thermal image; and
    projecting the visible representation of the thermal image into the first objective lens at a location offset from the center of the first objective lens so as to not completely obscure said first objective lens and so as to present, through the at least one eyepiece, the visible representation of the thermal image in alignment with the intensified first image in a fused image.

9. The method according to claim 8, wherein the first objective lens is part of a first imaging device and the second objective lens is part of a second imaging device, the method further comprising removably coupling the second imaging device to the first imaging device.

10. The method according to claim 8, further comprising collimating the visible representation of the thermal image.

11. The method of claim 8, wherein the location is a user-defined position with respect to the first objective lens.

12. A device for viewing a scene at visible and infrared wavelengths, comprising:
    a night-vision device configured to receive visible ambient light from a scene with a first objective lens having a center and form an intensified image of the scene using an image intensifier, the intensified image being viewable through at least one eyepiece; and
    a thermal imager that is removably mounted to the night-vision device with a mounting device, the thermal imager having a second objective lens and being configured to form a thermal image of the scene at the infrared wavelength and convert the thermal image to a visible representation of the thermal image of the scene using imaging electronics, the thermal imager further including a projector configured to project the visible representation of the thermal image into the first objective lens so that the visible representation of the thermal image and the intensified image can be simultaneously viewed through the at least one eyepiece.

13. The device according to claim 12, wherein the night-vision device comprises night-vision goggles having two eyepieces.

14. The device according to claim 12, wherein the night-vision device has a single eyepiece.

15. The device according to claim 12, wherein the mounting device includes a clip-on feature that allows the thermal imager to be clipped onto the night-vision device.

16. The device according to claim 12, wherein the imaging electronics includes a focal plane array (FPA), FPA processing electronics, and a display that displays the visible representation of the thermal image.

17. The device according to claim 16, wherein the display comprises an organic light-emitting diode display.

18. The device according to claim 12, wherein the infrared wavelength is in the range from about 8 microns to about 14 microns.

19. The device according to claim 12, wherein the infrared wavelength is in the range from about 1 micron to about 30 microns.

20. The device according to claim 12, wherein the projector is configured so that said projecting the visible representation of the thermal image into the first objective lens is performed using collimated light.

21. The device according to claim 12, wherein the projector is positioned relative to the night vision device such that the projector is offset of the center of the first objective lens.

* * * * *